UNITED STATES PATENT OFFICE.

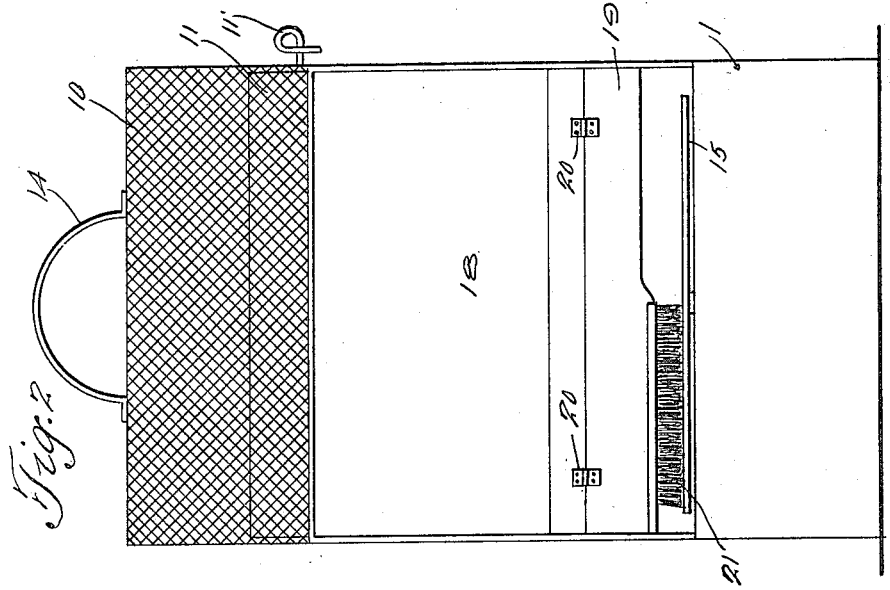
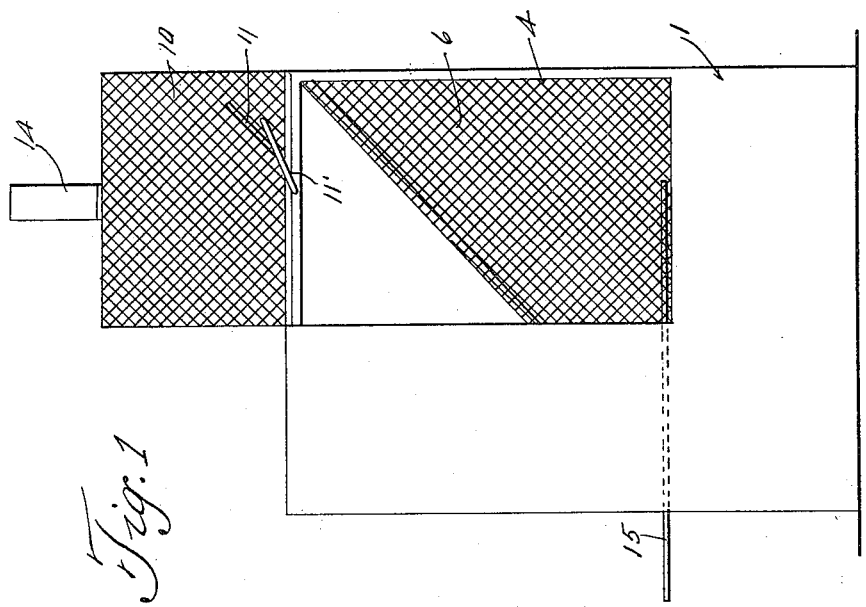

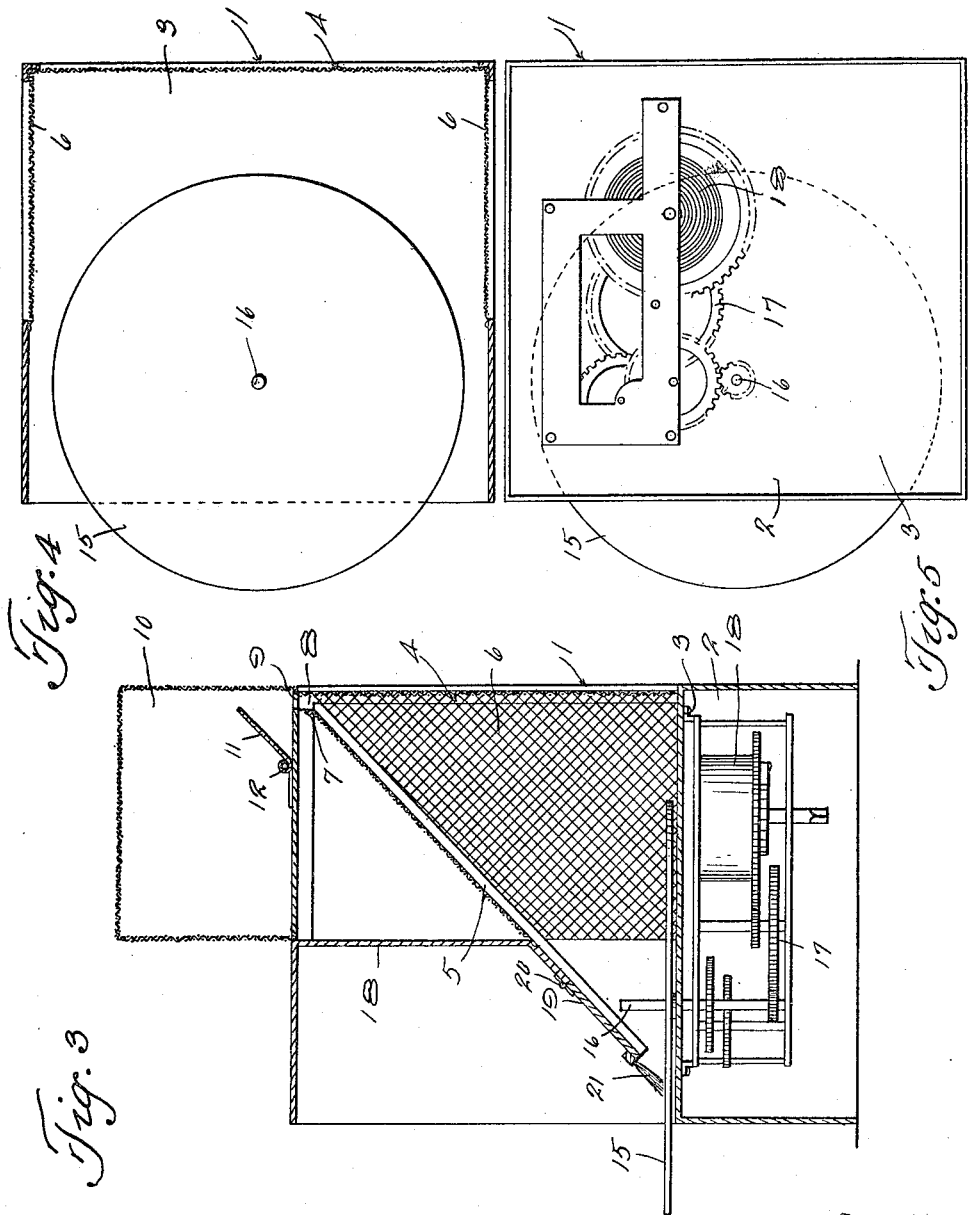

ALBERT S. JERNIGAN, OF CHEYENNE, OKLAHOMA, ASSIGNOR OF ONE-FOURTH TO J. L. M. CURRY AND A. J. SMITH, OF CHEYENNE, OKLAHOMA.

FLY-TRAP.

1,225,638.

Specification of Letters Patent.

Patented May 8, 1917.

Application filed December 8, 1915. Serial No. 65,734.

*To all whom it may concern:*

Be it known that I, ALBERT S. JERNIGAN, a citizen of the United States, residing at Cheyenne, in the county of Roger Mills and State of Oklahoma, have invented certain new and useful Improvements in Fly-Traps; and I do hereby declare the following to be a full, clear, and exact description of the invention, such as will enable others skilled in the art to which it appertains to make and use the same.

This invention relates to fly traps, and the primary object of the invention is to provide a trap which is constructed for attracting and catching flies, and which trap is comparatively simple in construction, so that it may be manufactured for a relatively small cost.

Another object of this invention is to provide a fly trap as specified which includes a rotary disk, which carries the bait for attracting the flies, which disk is rotatably mounted for passage within a trap and for carrying the flies within the trap while they are eating upon the disk, and further to provide a brush for preventing the flies from riding on the disk out of the trap, and causing them to leave the disk while positioned within the trap.

Another object of this invention is to provide a trap as specified which has associated therewith a removable cage for retaining the flies therein, so that the flies may be moved for the purpose of scalding, burning, or killing the flies in any other desired manner.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:

Figure 1 is a side elevation of the improved fly trap,

Fig. 2 is a front elevation of the fly trap,

Fig. 3 is a vertical section through the trap, and

Fig. 4 is a horizontal section through the fly trap,

Fig. 5 is a bottom plan of the trap.

Referring more particularly to the drawings, 1 designates the framework or body of the trap as an entirety, which has a base compartment 2, the upper end of which is closed by a horizontal top or board 3. The trap is provided with an upright portion 4 which extends upwardly above the board 3 and is provided with a diagonally extending partition 5, which is formed of foraminous material, preferably ordinary screen wire. The sides and back of the upright compartment 4 are also formed of meshwork, preferably screen wire. The angled partition 5 forms a top for the fly receiving compartment 6 and its upper edge is bent upwardly, as is shown at 7, extending parallel to the rear wall of the upright compartment for a relatively short distance, leaving a space, indicated at 8, between the vertical portion 7 of the angled partition 5 and the inner surface of the rear wall of the compartment 6, which space communicates with an opening 9 formed in the bottom of the cage 10. The cage 10 is constructed of foraminous material and it rests upon the upper surface of the upright portion 4 of the trap. A door 11 is hingedly connected, as is shown at 12, to the bottom of the cage 10 and is adapted for forming a closure for the opening 9. A handle 14 is attached to the upper surface of the cage 10 and is provided for facilitating the carrying of the cage, when it is desired to kill the flies which have passed therein.

A disk 15 is rotatably supported above the platform 3 and it has a portion of the same positioned for travel exteriorly of the compartment 6 for attracting flies and permitting the flies to light upon the disk exteriorly of the trap. The disk 15 is mounted upon a shaft 16, which extends vertically through the partition 3 and is connected by any suitable form of gearing, as shown at 17, to a coil spring motor 18 for rotating the disk. While in the drawings, a spring motor is illustrated for rotating the shaft 16 and the disk 15, it is to be understood that any suitable type of prime mover may be employed for this purpose without departing from the spirit of the invention.

The lower portion of the partition 5, which projects beyond the outer forward wall 18 of the upright section 4, has a door 19 hingedly connected thereto, as is shown at 20, which door extends forwardly over the upper end of the shaft 16 and has its lower end spaced above the disk 15, as clearly shown in Figs. 2 and 3 of the drawings. The door 19 is provided for permitting access to the interior of the trap. A brush 21 is attached to the door 19 and extends over one of the radii of the disk, brushing the upper surface of the portion of the disk which is traveling outwardly out of the trap for brushing the flies off the disk and causing them to fly into the compartment 6.

The door 11 has a handle 11' connected thereto for opening or closing the door.

In the operation of the improved fly trap; a paper disk which has sugar or analogous bait upon its upper surface, for the purpose of attracting the flies, is placed upon the upper surface of the disk 15 and the prime mover is started, which rotates the disk 15. The bait upon the paper disk attracts the flies, and while the flies are eating, they are carried by the rotation of the disk 15 into the compartment 6. When the portion of the disk upon which the flies are resting reaches the brush 21, the brush will dislodge the flies from the disk and cause them to enter the compartment 6. The nature of the flies will cause them to travel upwardly along the walls of the compartment, and naturally pass outwardly through the space 8 and the opening 9 into the cage 10. After any desired time, the door 11 may be closed, which will prevent the flies from escaping from the cage 10, and the cage may be removed for the purpose of killing the flies.

In reducing the invention to practice, certain minor features of construction, combination and arrangement of parts may necessitate alterations to which the patentee is entitled, provided such alterations are comprehended within the scope of what is claimed.

What is claimed is:

A fly trap comprising a lower receptacle of substantially rectangular formation, a motor mounted in said receptacle, an upper rectangular receptacle having an opened front, a partition arranged diagonally in said upper receptacle and positioned inward of said opened front and ending short of the top of the lower receptacle and spaced from the rear wall forming an outlet opening, a cage removably supported on the top of said upper receptacle having an opening registering with said outlet opening, a disk rotatably mounted on said motor and positioned partially inside and outside of said diagonal partition, a door hingedly connected to the front edge of said diagonal partition for permitting access to the interior of said upper receptacle, and a brush secured to the free edge of said door and partially overlying the same for engagement with said disk for the purpose specified.

In testimony whereof I affix my signature.

ALBERT S. JERNIGAN.

Copies of this patent may be obtained for five cents each, by addressing the "Commissioner of Patents, Washington, D. C."